Sept. 30, 1952 J. E. RANKS 2,612,605

PULSE DELAY CIRCUIT

Filed Dec. 15, 1950 2 SHEETS--SHEET 1

Inventor:
John E. Ranks,
by Merton D. Moore
His Attorney.

Sept. 30, 1952 J. E. RANKS 2,612,605

PULSE DELAY CIRCUIT

Filed Dec. 15, 1950 2 SHEETS--SHEET 2

Inventor:
John E. Ranks,
by Merton D. Moore
His Attorney.

Patented Sept. 30, 1952 2,612,605

UNITED STATES PATENT OFFICE 2,612,605

PULSE DELAY CIRCUIT

John E. Ranks, Syracuse, N. Y., assignor to General Electric Company, a corporation of New York Application December 15, 1950, Serial No. 200,921

8 Claims. (Cl. 250—27)

This invention relates to pulse delay circuits, particularly of the electronic type.

An electronic circuit finding increasing use in the electrical field, for providing a delayed control action is the so-called phantastron circuit. The phantastron circuit comprises a multi-grid electron discharge device which may be triggered by an input pulse to deliver a delayed output pulse. The phantastron circuit also has the desirable characteristic of providing a time delay which can be made substantially linearly variable with respect to the amplitude of the D.-C. anode voltage over a wide range of delay times. However, the conventional phantastron circuit lacks a sharply defined switching action in its operation. This deficiency is usually expressed in a small output voltage swing, together with an output voltage return to normal that has an undesirable slope, necessitating additional wave shaping stages or blocking oscillators to improve the output wave form. The undesirable slope of the phantastron output voltage is especially objectionable when employed for triggering purposes since the resultant jitter causes unreliable operation of succeeding stages.

An object of my invention is to provide an improved phantastron pulse delay circuit.

Another object of my invention is to provide an improved electronic pulse delay circuit whose delay may be varied substantially linearly over a wide range in response to an applied control signal.

A further object of my invention is to provide an electrical circuit for providing a pulse of improved shape and with a desired delay to trigger auxiliary circuits.

The novel features which I believe characteristic of my invention are set forth with particularity in the appended claims. My invention, however, both as to its organization and method of operation, together with further objects and advantages thereof, may best be understood by reference to the following description taken in connection with the accompanying drawings in which Fig. 1 shows in circuit diagram form one embodiment of the invention for achieving a delayed pulse of improved shape and Fig. 2 illustrates a further simplified embodiment of the invention.

Figure 1:
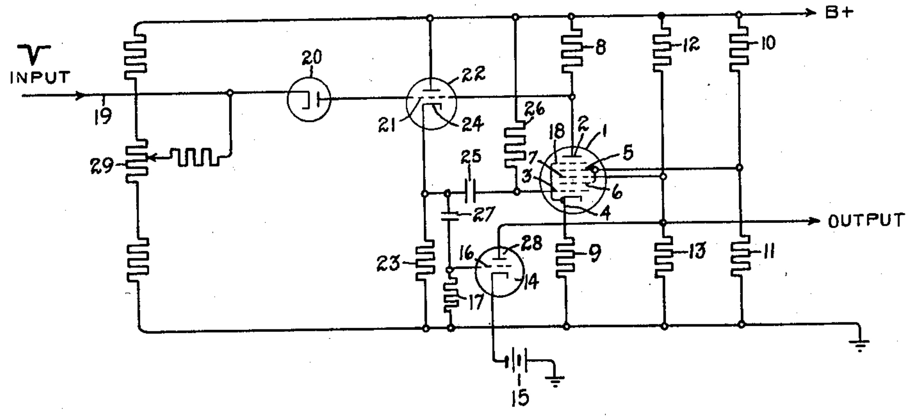
Figure 2:
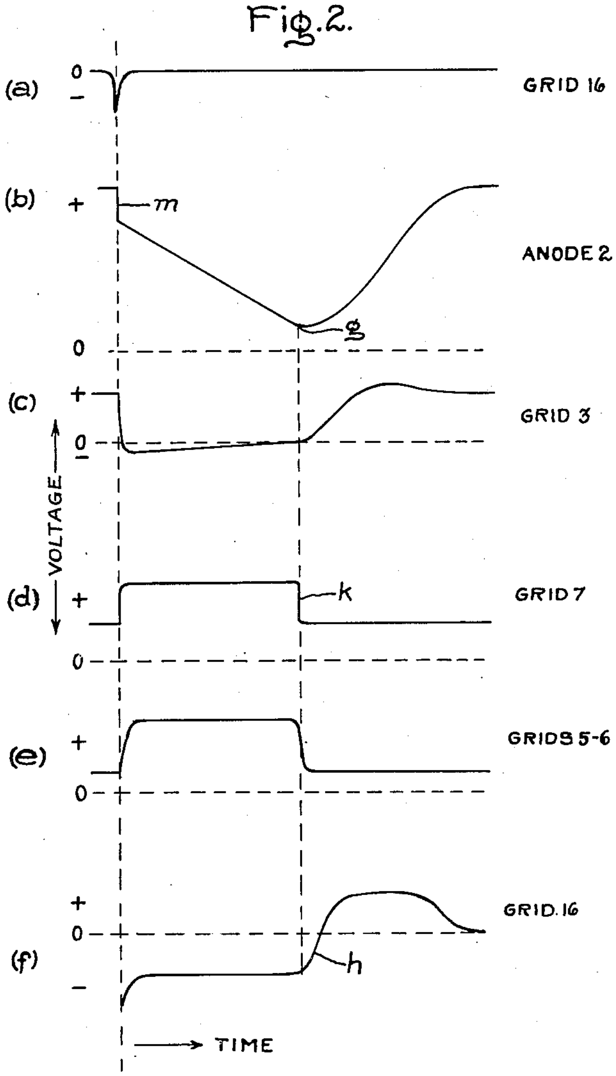

Referring to Fig. 1, there is disclosed a phantastron delay circuit comprising a multi-grid electron discharge device 1. Device 1 comprises an anode 2, a first control electrode 3, a cathode 4, grids 5 and 6 connected together and acting as a screen grid, and grid 7 operating as a second control electrode. In operation, anode 2 and the screen grid, comprising grids 5 and 6, act as separate output electrodes while grids 3 and 7 operate as separate control electrodes. In such an arrangement any control potential applied between the first control grid 3 and the cathode 4 controls the total electron discharge current flow to the anode and screen grid, whereas any control potential applied between the second control grid 7 and the cathode 4 controls the division of electron discharge current between the screen grid and the anode. By controlling the switching of a given amount of electron discharge current from the screen grid to the anode and then back to the screen grid, as for example, by a time constant circuit, an action similar to that of a multivibrator is obtained. This switching operation accounts for the delay action of the phantastron circuit.

Previous phantastron circuits have relied solely upon a single time constant circuit connected between one of the output electrodes and one of the control electrodes for controlling the rate at which current is switched from the screen grid comprising elements 5 and 6 to the anode 2 and also the rate at which the electron discharge current flow to the anode 2 is switched back to the screen grid. The result has been that the transition period, that is the period when current flow to the anode is a maximum until all of the current has been switched back to the screen grid has been unduly long and the switching action not sharply defined such that pulse shaping circuits were required to improve the phantastron output pulse. In accordance with the invention, by deriving a switching control voltage from the voltage developed at anode 2 and applying it to the second control grid 7 during the switchback period, an improved phantastron output wave shape has been achieved.

In the particular embodiment shown in Fig. 1, anode 2 is connected to the source of positive unidirectional potential B+ by the loading resistor 8 whereas the cathode 4 is connected through the un-bypassed loading resistor 9 to ground. The screen grid, comprising grids 5 and 6 tied together, is connected to the junction of resistors 10 and 11 acting as a voltage divider across the source of B+ potential. The second control grid 7 is connected to the junction of resistors 12 and 13 acting as a voltage divider across the source of B+ potential. In addition, grid 7 is also connected through the electron discharge path of device 14 to the negative source of potential 15. The control grid 16 of device 14 is connected to ground through resistor 17 such that device 14 is normally conducting to apply the negative unidirectional potential of source 15 to the grid 7. The actual potential existing at grid 7 under these conditions is determined by the potential of source 15 and the portion of the B+ potential developed across resistor 13. Under normal conditions, these voltages are so adjusted that the potential of grid 7 is negative with respect to the potential of cathode 4. Grid 18, acting as a suppressor grid, is connected to cathode 4. The potentials of grids 3, 5, 6 and 7 with respect to the cathode 4 are so selected that in the steady state, that is, with no input signal applied to the first control grid 3, no anode current flows in device 1, and all of the electron discharge current flows to the screen grid comprising grids 5 and 6.

Pulses which are required to be delayed a given amount are applied as input pulses to the first control electrode 3. Application of a negative input pulse to grid 3 initiates one cycle of operation of the phantastron circuit comprising device 1, such that a delay pulse is delivered over the lead marked output.

In the arrangement of Fig. 1, the negative triggering pulses which are to be delayed are applied over lead 19 through a diode 20 to the grid 21 of electron discharge device 22. Device 22, with its anode connected to B+ and its cathode 24 connected to ground by resistance 23, operates as a cathode follower. Thus, the negative going trigger pulse applied to grid 21 also appears across the unbypassed cathode load resistance 23 for application by coupling condenser 25 to the first control grid 3. This negative pulse is also applied by the condenser 27 to the grid 16 of device 14.

The arrival of the negative trigger pulse at control grid 3 causes an immediate reduction in electron discharge current flow in device 1, such that the relative potential between the second control grid 7 and cathode 4 is changed, thereby switching some small amount of screen current to the anode electrode 2. More important, however, the negative trigger pulse applied to grid 16 immediately cuts off electron discharge device 14, thereby removing the source of negative potential 15 from the second control grid 7 such that the voltage at grid 7 goes positive depending upon the relative values of bleeder resistors 12 and 13. This sudden positive going voltage applied to the control grid 7 immediately switches a substantial amount of electron discharge current flow from the screen to the anode 2.

The negative trigger pulse applied to grid 3 by condenser 25 charges the grid side of condenser 25 negatively thereby maintaining current flow to the anode. However, resistance 26 connecting condenser 25 to the B+ source, discharges condenser 25 exponentially at a rate determined by the time constant of resistance 26 and condenser 25, such that current flow to the anode will be switched back to the screen grid after a given time interval.

A feed-back connection is provided between an output electrode and one of the control electrodes to further control the switching of current to and from one of the output electrodes. In the present instance the feed-back connection comprises a connection from the anode 2 to the control electrode 21 of device 22 and from the output circuit connected to cathode 24 through condenser 25 to the first control electrode 3 of device 1. As previously mentioned, the grid 3 is connected to the source of B+ potential by the resistance 26, and cathode 24 is connected by load resistance 23 to ground. As soon as some electron discharge current flow has been switched from the screen to the anode 2 by the arrival of a negative going trigger pulse at the first control electrode 3 and at the control electrode 16 of device 14, a negative going voltage is developed at the anode 2. By applying this negative going voltage to the first control grid of device 1 via the feedback path, a further increase in anode current may be achieved to lengthen the delay time of the phantastron circuit. By properly proportioning the amount of negative feed-back voltage applied from the anode 2 to the grid 3 via the feed-back path, a linear charging curve for condenser 25 and hence, a linear rise in the voltage at grid 3 is obtained. This in turn provides a linear increase of electron discharge current flow to anode 2.

When the current flow to the anode of device 1 has reached a maximum and can increase no further, then no more feed-back voltage is generated, and hence, the voltage at grid 3 would take the exponential charging curve established by the time constant circuit comprising condenser 25 and resistance 26. This exponential charging curve has an undesirable slope as previously mentioned, such that the transition period between maximum anode current flow until all the anode current flow has been switched back to the screen grid is unduly long and not sharply defined. The result is a delayed output pulse of undesired shape.

To improve the wave shape of the output pulse, the voltage at anode 2 is differentiated to provide a positive going control voltage as soon as the anode current fails to increase further. This positive going trigger voltage is then employed to cause device 14 to conduct once again thereby applying the negative potential from source 15 to the second control grid 7 which in turn switches current flow from the anode back to the screen grid. Specifically, the differentiation is accomplished by condenser 27 and resistor 17 connected across the output load resistor 23 of the cathode follower comprising device 22. Thus, after the initial drop in voltage at anode 2 due to application of the trigger pulse to grid 3, the linearly rising current at the anode 2 due to feed-back results in a linearly decreasing voltage being developed across resistor 23. This decrease continues as long as the electron discharge current to anode 2 can increase. However, when no further increasing current flow to anode 2 is possible, the previously linearly decreasing anode voltage levels off. The decreasing voltage at anode 2 is applied to control grid 21 of device 22 to yield a corresponding decreasing voltage across resistance 23. Condenser 27 and resistance 17 differentiate this voltage to yield a positive going voltage at the instant of the leveling off action. This positive going control voltage is applied to control electrode 16 causing device 14 to conduct and to apply the potential from source 15 to the control electrode 7. This causes a rapid switch-over of electron discharge current flow from the anode to the screen grid, comprising elements 5 and 6. Upon the completion of the switchover, the original conditions are reestablished where no current flows to the anode 2 and all of the electron discharge current flows to the screen grid comprising elements 5 and 6.

Electron discharge device 14, which was cut off upon the application of the negative input trigger pulse to grid 16, is held nonconductive for a period determined by the linear voltage decrease of anode 2, and then caused to conduct again upon the termination of this linear decrease voltage due to operation of the differentiating circuit comprising elements 27 and 17. Thus, the output voltage of device 14, developed at anode 28, yields a positive going square wave of voltage whose trailing edge occurs a given time interval after the arrival of an input trigger pulse 19. Since the cut-off and conduction intervals of device 14 are well defined, the voltage developed at the anode 28 and, hence, also at the second control grid 7 may be employed as the delayed output pulse.

By changing the initial voltage level at the anode 2 by means of potentiometer 29, it is possible to correspondingly change the time required for the linear increase in anode current flow to reach its maximum. This results in a change in the width of the positive square wave developed at anode 28 and, hence, a change in the delayed time of occurrence of the trailing edge of this square wave with respect to the arrival of the incoming trigger pulse over lead 19. In the arrangement of Fig. 1, this is attained by employing diode 20 to limit the voltage from which anode 2 starts its negative going excursion. Thus, the movable tap on potentiometer 29 connected across the B+ source is set at a predetermined level such that the diode 20 conducts when the anode voltage at 2 rises to this value. Between pulses the anode voltage is limited very nearly to the voltage developed at the tap on potentiometer 29, since the anode load resistor 8 is normally very large. Resistor 8 is made large in order that the small change in anode current will develop a large voltage to provide a high degree of feedback to condenser 25. In this way the dischange current of condenser 25 through resistor 26 during the anode current flow period is kept nearly constant and a very closely linear discharge of condenser 25 is obtained. Upon application of a negative trigger pulse to lead 19, a certain amount of current is switched from the screen grid 5, 6 to the anode 2, causing the voltage at anode 2 to decrease quickly, thereby cutting off diode 20. With diode 20 cut off, the voltage across condenser 25 during the anode current flow period is in no way affected by the setting of potentiometer 29. Thus, the initial change in voltage on anode 2 and on condenser 25 during the pulse period is controlled directly by the adjustment of potentiometer 29. Since the condenser 25 is discharged at an essentially constant rate, the slope of the anode voltage wave varies in an almost perfectly linear manner.

Referring to Fig. 2, the voltage wave shapes encountered at different points in the circuit arrangement of Fig. 1 are plotted as a function of time. Thus, prior to the arrival of the incoming negative trigger pulse shown at *a*, all of the electron discharge current of device 1 flows to the screen grids comprising 5 and 6 as evidenced by the reduced voltage shown in graph *e*, whereas the maximum positive potential at anode 2 shown in graph *b* indicates no flow of anode current. The grid 3 is normally maintained at a positive potential, as shown in graph *c*, whereas the grid 16 of device 14 is substantially at ground potential as shown in graph *f*. Upon arrival of the incoming negative trigger shown in graph *a*, the grid 16 of device 14 is driven negative and the potential at grid 7, shown in graph *d*, is driven positive, due to removal of the negative potential source 15. With grid 7 positive with respect to the cathode 4, current flows to anode 2, as shown by the decrease in its anode voltage, with a corresponding decrease in screen grid current flow such that the voltage at the screen grid rises as shown in graph *e*. After the occurrence of the initial pulse of negative voltage shown in graph *b*, generated substantially at the instant of arrival of the negative trigger shown in *a*, the phantastron time constant circuit begins to discharge at a linear rate, thereby allowing the potential at grid 3 shown in graph *c* to rise. The rise in potential at grid 3 increases the anode current flow resulting in a corresponding linear decrease in anode 2 voltage as shown in graph *b*. When the voltage at anode 2 reaches its minimum value, corresponding to a maximum anode current flow, there occurs an interval *g*, shown in graph *b*, during which the potential at anode 2 can no longer decrease and grid 3 begins to go more positive at a rate determined by condenser 25 and resistor 26. Differentiation of the voltage at anode 2 by condenser 27 and resistance 17 yields a positive going pulse *h*, shown in graph *f*, occurring substantially at the instant *g*. This positive going pulse, when applied to grid 16 of device 14, causes device 14 to conduct and thereby apply the negative potential of source 15 to grid 7 as shown in graph *d*. Application of this negative potential to grid 7 immediately causes a switchover of current flow from anode 2 to screen grid 5, 6, as evidenced by the drop in voltage shown in graph *e*. The delayed output pulse from the modified phantastron circuit is shown in graph *d*. The negative going trailing edge *k* occurs a predetermined time after the occurrence of the trigger pulse shown in graph *a*. The delayed time of occurrence of this edge depends upon the slope of the linear decrease in voltage at anode 2 shown in graph *b* and also upon the initial voltage *m* which is controlled by the setting of the movable tap on potentiometer 29.

Figure 3:
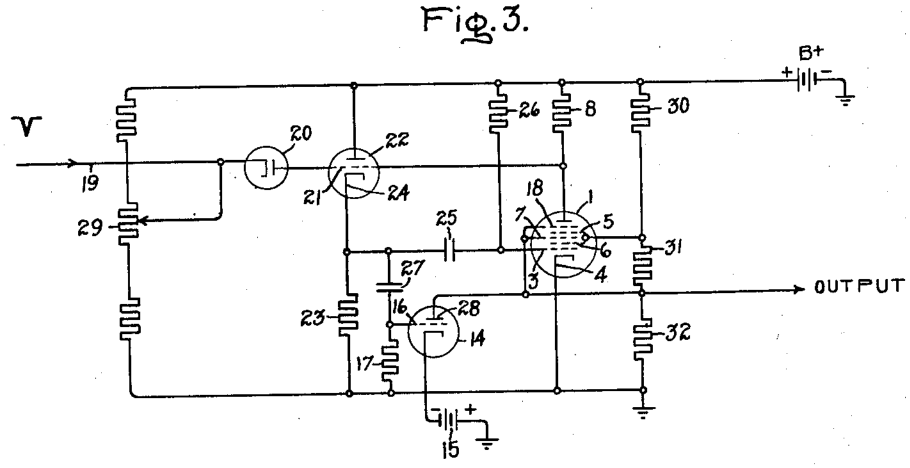

Fig. 3 illustrates a modification of the arrangement of Fig. 1 wherein certain circuit simplifications have been achieved. Since many of the circuit elements of Fig. 1 have been retained in Fig. 3, common reference numerals have been assigned to corresponding elements. Cathode 4 is now directly connected to ground, while the suppressor grid is connected to the control grid 7. The positive potential for the screen grid, comprising elements 5 and 6, is obtained at the junction of resistors 31 and 30 connected in the series with resistor 32 across the source of B+ potential. Grid 7 is connected to the junction of resistors 31 and 32 in the same voltage divider circuit to the anode 28 of device 14. As before, discharge device 14 is normally conducting to apply the negative potential of source 15 to the control grid 7, such that all of electron discharge current flow flows to the screen grid and none to the anode 2. Since the cathode 4 is now grounded, switching of the electron discharge current of device 1 between screen grid, comprising elements 5 and 6, and anode 2 is completely under the control of the potential applied to grid 7. This is in contrast to the arrangement of Fig. 2 where the voltage at grid 7 was varied under control of device 14 and the voltage at cathode 4. As before, prior to receipt of a negative input trigger, the potential at grid 7 is determined by the relative potential of source 15 and the portion of B+ potential developed across resistor 32 through the voltage divider network comprising 30, 31, and 32. The potential at grid 7 is adjusted to be negative with respect to the cathode potential 4 under normal conditions. Upon the application of the negative input trigger to grid 3 from lead 19 through cathode follower 22 as before, there occurs a small drop in anode 2 potential due to increased current flow followed by a constant rate of anode voltage decrease due to linear discharge of condenser 25 through resistor 26. This voltage drop at anode 2 is developed across resistor 23 in normal cathode follower fashion, differentiated by condenser 27 and resistor 17, and applied as a negative going trigger to cut off device 14, thereby allowing the voltage on grid 7 to be determined solely by the bleeder resistances 30, 31 and 32 connected across the B+ source. Grid 7 now being at a positive potential, permits continued anode current to flow until peak current flow is reached. Thereupon, the condenser 25 starts to discharge exponentially toward the B+ potential through resistor 26. The voltage at anode 2, when differentiated by condenser 27 and resistor 17, yields a positive going pulse occurring substantially at the peak current flow interval. When applied to the grid 16 of device 14, this positive pulse causes device 14 to conduct and thereby apply the negative potential of battery 15 to the grid 7. This results in a more abrupt anode current decrease resulting in a decreased transition period from maximum anode current flow to zero current flow. It is this action of device 14 which produces a high amplitude gate with a fast rise and fall time which may be used to trigger other circuits without further shaping. The invention thus provides an improved pulse output at the anode 28 of device 14 resulting in a more reliable triggering action of subsequent circuits while also extending the effective range of pulse delay output in the shorter delay time direction.

Although applicant's invention has been disclosed in the preferred circuit embodiments of Figs. 1 and 3 wherein current switching control signals of a given polarity were applied to specific control electrodes, it is obvious that similar results could be obtained by the use of other control electrodes affording a similar effective control action in response to applied signals of appropriate polarity. This flexibility is indicated by the different switching circuits embodied in Figs. 1 and 3 for controlling the relative potentials of grids 7 and cathode 4.

While a specific embodiment has been shown and described, it will, of course, be understood that various modifications may be made without departing from the invention. The appended claims are, therefore, intended to cover any such modifications within the true spirit and scope of the invention.

What I claim is new and desire to secure by Letters Patent of the United States is:

1. In combination, a monostable circuit operable from an initial stable state to an unstable state in response to a triggering pulse and returning to the initial state automatically comprising an electron discharge device including a control electrode, said device generating a voltage wave in response to said trigger pulse, said generated wave having an inflection point occurring a given time after the occurrence of said trigger pulse, but prior to return of said circuit to the initial state, means for differentiating said voltage to derive a control pulse at the instant of said inflection, and means for modifying operation of said monostable circuit comprising means for applying said control pulse to said control electrode.

2. In combination, an electron discharge device comprising a pair of electrodes, means for energizing said device to maintain each of said electrodes at a respective stable voltage, said device being responsive to an input signal for altering said voltages, a time constant circuit connected to said device for returning said electrodes to their stable voltage condition after a given time interval, means for differentiating the voltage at one of the electrodes during the altered condition, and means responsive to said differentiated voltage for changing the time required for returning said electrodes to their stable condition.

3. In combination, an electron discharge device comprising a pair of electrodes, means for maintaining said electrodes at given potentials comprising means for energizing said device to maintain the division of electron discharge current between said electrodes at an intial condition, means responsive to an input signal for altering the division of electron discharge current between said electrodes, a time constant circuit connected to said device for returning the division of current between said electrodes to its initial condition after a given time interval, means for differentiating the voltage at one of said electrodes during the altered current condition, and means responsive to said differentiated voltage for changing the time rate of return of the division of current between said electrodes to said initial condition.

4. In combination, an electron discharge device comprising a pair of output electrodes and a plurality of control electrodes, means for energizing said device to maintain a stable division of electron discharge current flow between said output electrodes, means for altering the division of current flow between said output electrodes comprising means for energizing one of said control electrodes, a source of fixed unidirectional potential, a time constant circuit connected to said device for returning said division of current to its stable state, said circuit comprising a condenser coupling one of said output electrodes to another of said control electrodes and a resistance coupling said other control electrode to said source of fixed unidirectional potential, and means for changing the time rate of return of said division of current to its stable state comprising means responsive to the potential of said one output electrode during the transition back to said stable state for applying a switching signal to another of said input electrodes.

5. A pulse delay circuit comprising an electron discharge device including a plurality of input electrodes and a pair of separate output electrodes, means for normally maintaining one of said output electrodes in a conductive state for electron discharge device current and the other output electrode in a non-conductive state for electron discharge device current, an input electrode responsive to a trigger pulse of given polarity for reversing said states, a resistance connecting one input electrode to a source of fixed positive potential and a condenser connected between said normally non-conductive electrode and said input electrode connected to said positive potential for returning said output electrodes to their normal states after a given time interval, a source of bias potential, means for increasing the time rate of return of said output electrodes to their normal states comprising means for differentiating the output voltage wave shape at said normally non-conductive electrode during conduction, and means responsive to said differentiated voltage for controlling the potential of another of said input electrodes.

6. A pulse delay circuit comprising an electron discharge device including a plurality of input electrodes, a cathode, an anode, and a screen grid, one of said input electrodes controlling the total electron discharge current flow in said device, the other electrode controlling the division of electron discharge device current flow between said anode and screen grid, means for normally maintaining said screen grid in a conductive state for electron discharge device current and the anode in a non-conductive state for electron discharge device current comprising means for biasing said other electrode relative to said cathode electrode, said one electrode responsive to a trigger pulse of given polarity for reversing said states, a resistance connecting said one electrode to a source of fixed positive potential, a condenser connected between said anode and said one electrode for returning said anode and screen grid to their normal states after a given time interval, a source of bias potential, means for increasing the time rate of return of said anode and screen grid to their normal states comprising means responsive to the voltage wave shape at said anode during conduction for applying said bias potential to said other electrode.

7. A pulse delay circuit comprising an electron discharge device including a plurality of input electrodes and a pair of separate output electrodes, means for normally maintaining one of said output electrodes in a conductive state for electron discharge device current and the other output electrode in a non-conductive state for electron discharge device current comprising means for biasing one of said input electrodes relative to said cathode electrode, another of said input electrodes responsive to a trigger pulse of given polarity for reversing said states, a resistance connecting said other input electrode to a source of fixed positive potential and a condenser connected between said normally non-conductive electrode and said other input electrode for returning said output electrodes to their original states after a given time interval, a source of negative bias potential, means for increasing the time of rate of return of said output electrodes to their original states comprising means for differentiating the voltage wave shape at said normally non-conductive electrode during conduction, means normally inoperative responsive to said differentiated voltage for applying said bias potential to said one input electrode.

8. A pulse delay circuit comprising an electron discharge device including a plurality of input electrodes, a cathode electrode and a pair of separate output electrodes, one of said input electrodes controlling the total cathode current flow in said device, another of said input electrodes controlling the division of cathode current flow between said output electrodes, means for normally maintaining one of said output electrodes in a conductive state for electron discharge device current and the other output electrode in a non-conductive state for electron discharge device current comprising means for biasing said other input electrode relative to said cathode electrode, said one input electrode responive to a trigger pulse of given polarity for reversing said states, means for returning said output electrodes to their original states after a given time interval comprising a resistance connecting said one input electrode to a source of fixed unidirectional potential and a condenser connected between said normally non-conductive electrode and said one input electrode, a source of unidirectional bias potential, means for increasing the time rate of return of said output electrodes to their normal states comprising means for differentiating the voltage wave shape at said normally non-conductive electrode during conduction, and means for controlling the application of said bias potential to said other electrode under control of said differentiated voltage.

JOHN E. RANKS.

REFERENCES CITED

The following references are of record in the file of this patent:

"Waveforms," Radiation Laboratories, vol. 19, paragraphs 5.15-5.18, pages 195-204, 1st ed., 1949.